United States Patent
Stachyra et al.

(10) Patent No.: US 9,035,528 B2
(45) Date of Patent: May 19, 2015

(54) PRESS PLATE FOR TIGHTENING THE METAL SHEETS OF A STATOR CORE OF AN ELECTRIC MACHINE

(75) Inventors: Leszek Stachyra, Wroctaw (PL); Jacek Mariusz Kanicki, Wroclaw (PL); Daniel Hediger, Othmarsingen (CH); Lothar Eckert, Habsburg (CH)

(73) Assignee: ALSTOM TECHNOLOGY LTD., Baden (CH)

( * ) Notice: Subject to any disclaimer, the term of this patent is extended or adjusted under 35 U.S.C. 154(b) by 84 days.

(21) Appl. No.: 13/106,961

(22) Filed: May 13, 2011

(65) Prior Publication Data

US 2011/0278982 A1    Nov. 17, 2011

(30) Foreign Application Priority Data

May 13, 2010    (EP) .................................... 10461515

(51) Int. Cl.
| | |
|---|---|
| *H02K 1/06* | (2006.01) |
| *H02K 5/15* | (2006.01) |
| *H02K 1/16* | (2006.01) |
| *H02K 1/18* | (2006.01) |
| *H02K 3/50* | (2006.01) |

(52) U.S. Cl.
CPC .................. *H02K 1/16* (2013.01); *H02K 1/185* (2013.01); *H02K 3/505* (2013.01)

(58) Field of Classification Search
CPC ................................. H02K 1/06; H02K 15/10
USPC ..................... 310/216.113, 216.114, 216.126, 310/216.129, 216.131, 216.133, 216.134, 310/270, 400, 402–413, 415, 422, 427, 432, 310/254.1, 216.127
See application file for complete search history.

(56) References Cited

U.S. PATENT DOCUMENTS

| | | | | |
|---|---|---|---|---|
| 2,216,784 | A | * | 10/1940 | Payne ......................... 29/525.14 |
| 4,252,163 | A | * | 2/1981 | Onda et al. .................... 144/132 |
| 4,306,168 | A | * | 12/1981 | Peachee ......................... 310/400 |
| 4,578,852 | A | * | 4/1986 | Sauerwein et al. ............. 29/596 |
| 4,609,158 | A | * | 9/1986 | Wilson ........................... 241/300 |
| 5,051,642 | A | * | 9/1991 | Hediger et al. ................ 310/260 |
| 6,104,116 | A | * | 8/2000 | Fuller et al. ............ 310/216.124 |
| 2008/0015592 | A1 | * | 1/2008 | Long et al. ........................ 606/69 |

FOREIGN PATENT DOCUMENTS

| | | | |
|---|---|---|---|
| CN | 201438648 U | | 4/2010 |
| DE | 2161139 | | 6/1973 |
| DE | 2913972 | | 10/1980 |
| JP | 2006060954 A | * | 3/2006 |

OTHER PUBLICATIONS

Angle conversion Table; Http://www.aqua-calc.com/convert/angle/arc-minute-to-degree.*

(Continued)

*Primary Examiner* — Jose Gonzalez Quinones
(74) *Attorney, Agent, or Firm* — Buchanan Ingersoll & Rooney PC

(57) ABSTRACT

A press plate (5) for tightening the metal sheets (2) of a stator core of an electric machine has an annular element (16) with a plurality of holes (17) provided at a side wall (11) thereof. The holes (17) have an elongated recessed top portion (20) and a cylindrical recessed bottom portion (21) extending from the ceiling (22) of the elongated recessed top portion (20).

15 Claims, 2 Drawing Sheets

(56) References Cited

OTHER PUBLICATIONS

European Search Report for EP Patent App. No. 10461515.8 (Nov. 4, 2010).

Office Action from the Chinese Patent Office dated Aug. 7, 2014, issued in corresponding Chinese Patent Application No. 2011-10128600.2, with English translation thereof. (17 pages).

* cited by examiner

PRESS PLATE FOR TIGHTENING THE METAL SHEETS OF A STATOR CORE OF AN ELECTRIC MACHINE

This application claims priority under 35 U.S.C. §119 to European App. No. 10461515.8, filed 13 May 2010, the entirety of which is incorporated by reference herein.

BACKGROUND

1. Field of Endeavor

The present invention relates to a press plate for tightening the metal sheets of a stator core of an electric machine. In particular the present invention relates to the stator core of a rotating electric machine such as an electric generator.

2. Brief Description of the Related Art

With reference to FIG. 1, rotating electric machines such as electric generators have a stator core 1 with an annular shape; within the stator core 1, a rotor (not shown) is housed.

The stator core 1 is made of a plurality of metal sheets 2 grouped in packets 3; each packet 3 is separated from the adjacent packets via spacers (not shown), to define stator cooling channels 4.

In order to keep all the metal sheet packets 3 together, press plates 5 are provided at the two opposite stator core ends, to fix and press the metal sheet packets 3 together.

In order to connect the press plates 5 to the metal sheet packets 3, key bars 6 (that are under tension load) are welded to the metal sheets 2; in addition, straps 7 are welded at the ends of the key bars 6 and are inserted in recessed seats 8 of the press plates 5.

Traditionally, in order to guarantee the stator core tightening, the metal sheet packets 3 are pre-compressed (pre-compression is kept over the lifetime of the generator); generally pre-compression is achieved by vibration and pressing.

In addition, in order to obtain an additional compressive force at the inner diameter of the core, the press plates 1 are provided with a tapered wall 10 that is pressed against the end metal sheet packets, such that the tapered wall 10 deforms to have all its portions in contact with the end metal sheet packets.

This configuration allows a large pre-compression force to be applied on the metal sheet packets 3, such that they are well tightened in all conditions; nevertheless, it also causes a very high stress to be induced within the press plates 5.

In addition, as shown in FIG. 1, a press plate wall 11 opposite the tapered wall 10 has threaded cylindrical holes 13, arranged to receive screws connecting the end winding supports 15.

These holes 13 cause high stress peaks within the press plates 5 in the zones close to them; in particular, tests showed that these stress peaks may also be larger than three times the stress of press plate zones without holes 13.

It is clear that these high stress peaks are very troubling and should be reduced.

SUMMARY

One of numerous aspects of the present invention relates to a press plate by which the aforementioned problems of the known art are addressed.

Another aspect includes a press plate in which the stress peaks are limited and, in any case, they are lower than in traditional press plates.

BRIEF DESCRIPTION OF THE DRAWINGS

Further characteristics and advantages of the invention will be more apparent from the description of a preferred but non-exclusive embodiment of the press plate illustrated by way of non-limiting example in the accompanying drawings, in which.

DETAILED DESCRIPTION OF EXEMPLARY EMBODIMENTS

Figure 1:
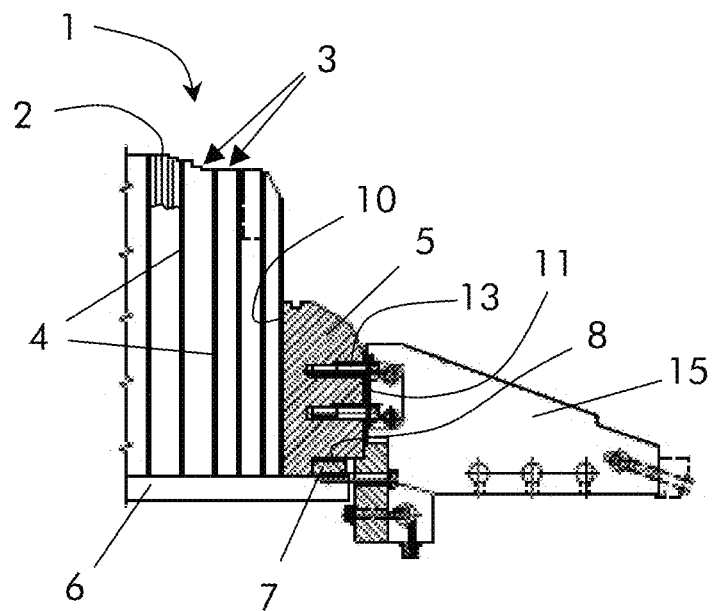
FIG. 1 is a schematic longitudinal section of a traditional press plate with a side connected to an end metal sheet packet and the opposite side connected to an end winding support.
Figure 2:
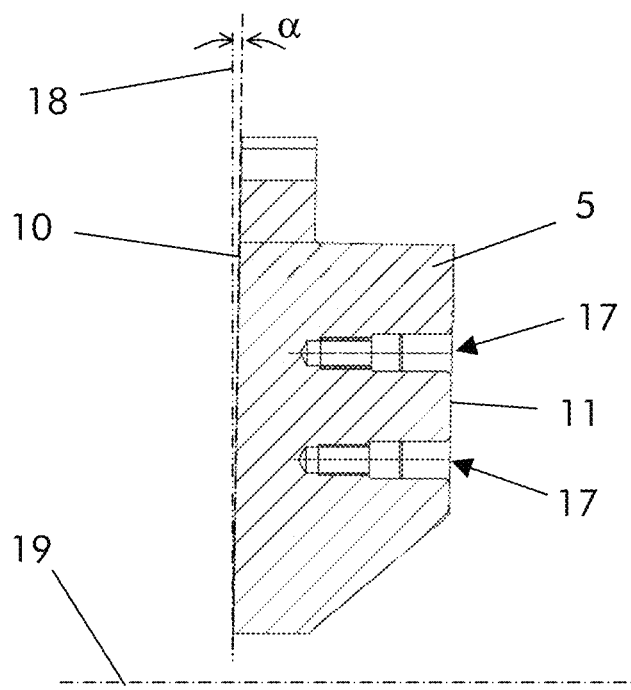
FIG. 2 is a longitudinal section of a press plate in an embodiment of the invention.
Figure 3:
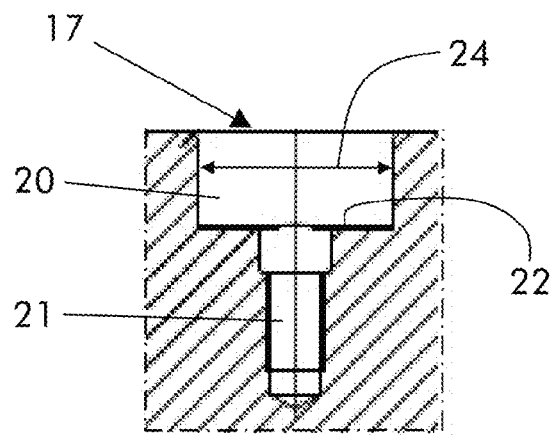
FIG. 3 is a circumferential section of a press plate at a hole in an embodiment of the invention.
Figure 4:
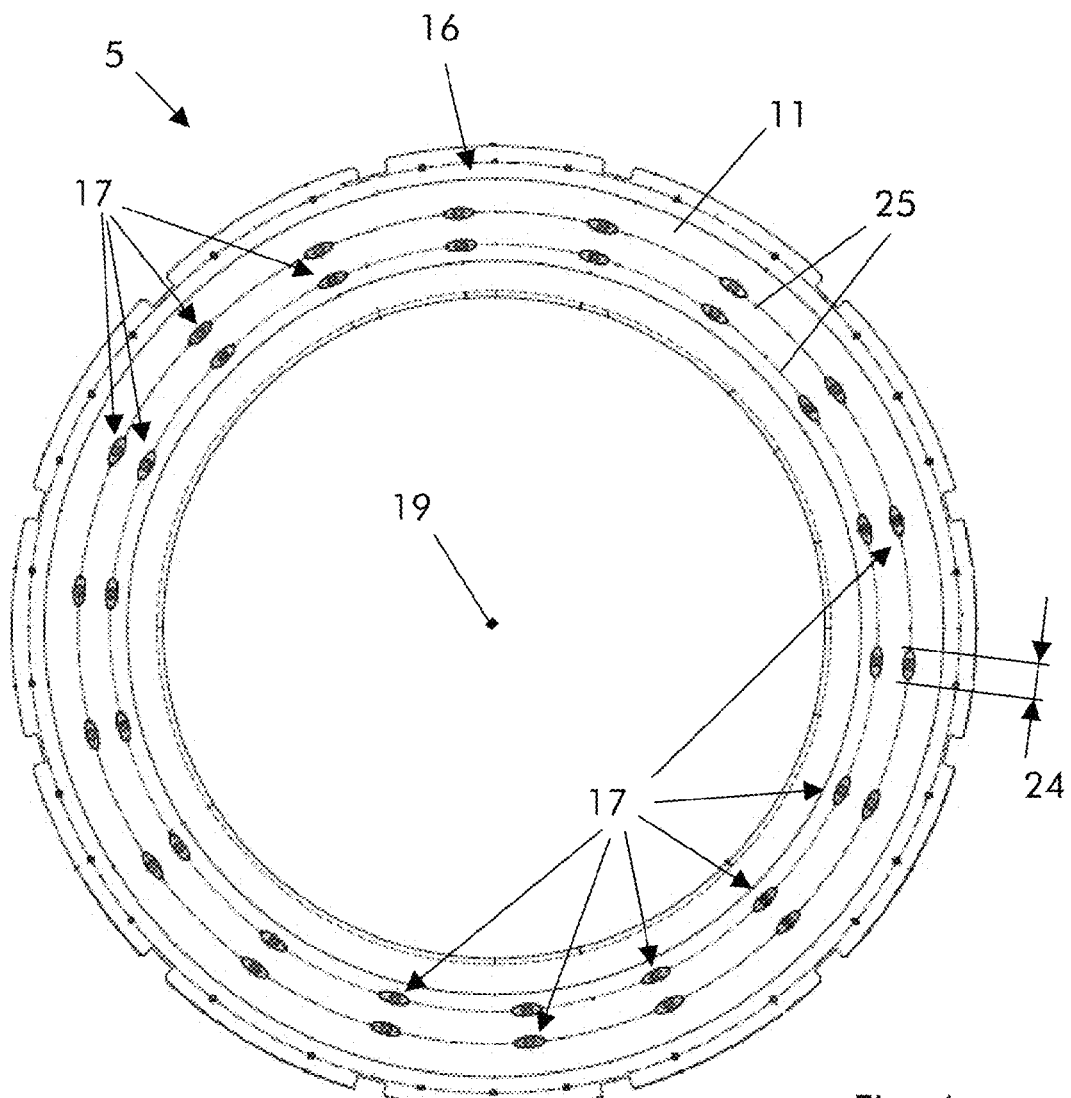
FIG. 4 is a front view of a press plate in an embodiment of the invention.

With reference to FIGS. 2-4, a press plate 5 for tightening the metal sheets 2 of a stator core is illustrated.

In the following, like reference numbers are used for elements similar to those already described.

The press plate 5 includes an annular element 16 with a plurality of holes 17 provided at a side wall 11 thereof.

A wall 10 opposite the wall 11 is tapered; preferably the taper angle $\alpha$ between the tapered side wall 10 and an axis 18 perpendicular to the longitudinal axis 19 of the annular element 16 is less than 2°.

The holes 17 have a (circumferentially) elongated recessed top portion 20 and a cylindrical recessed bottom portion 21 extending from the ceiling 22 of the elongated recessed top portion 20.

In particular, the elongated recessed top portion 20 has a longer axis 24 that is tangential to a circumference 25 having its centre on the longitudinal axis 19 of the annular element 16. This allows the imaginary uniform stress lines to be substantially parallel to the axis 24 and the stress concentration to be decreased.

In different embodiments, the elongated recessed top portion 20 has an elliptical shape or an oval shape.

The depth of the elongated recessed top portion is such that in the transition zone between the portions 20 and 21, the stress preferably continuously decreases or, even if stress increases, the increase is limited and is preferably less than the maximum stress at the portion 20 (i.e., the stress at the wall 11).

Tests and calculations showed that stress at the wall 11 can be sensibly reduced.

In practice the materials used and the dimensions can be chosen at will according to requirements and to the state of the art.

REFERENCE NUMBERS 1 stator core
2 metal sheets
3 metal sheets packets
4 cooling channels
5 press plate
6 key bars
7 straps
8 seats
10 tapered wall
11 wall opposite to 10
13 (traditional) cylindrical holes
15 end winding supports
16 annular element
17 holes
18 axis 19 axis
20 elongated recessed top portion of 12
21 cylindrical recessed bottom portion of 12
22 ceiling of 20
24 longer axis of 20
25 circumference
α angle between 15 and 16

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. A press plate for tightening the metal sheets of a stator core of an electric machine, the press plate comprising:
    an annular element having a side wall with a plurality of holes arranged around the annular element, wherein the annular element defines a longitudinal axis and a circumference having a center at said longitudinal axis; and
    wherein at least one of said plurality of holes has a recessed top portion having a depth and a ceiling, the recessed top portion being elongated in a direction perpendicular to said depth and comprises a shorter axis and a longer axis that is tangential to said circumference making said recessed top portion circumferentially elongated, and a cylindrical recessed bottom portion being threaded to receive a screw and extending from the ceiling of the elongated recessed top portion.

2. A press plate as claimed in claim 1, wherein said recessed top portion has an elliptical shape.

3. A press plate as claimed in claim 1, wherein said recessed top portion has an oval shape.

4. A press plate as claimed in claim 1, further comprising: a tapered side wall opposite said side wall.

5. A press plate as claimed in claim 4, wherein said tapered side wall is tapered at a taper angle (α) from an axis perpendicular to the annular element longitudinal axis less than 2°.

6. A press plate as claimed in claim 1, wherein said plurality of holes are arranged in an inner row and an outer row.

7. A press plate as claimed in claim 1, comprising: a screw for each of the plurality of holes, which is configured to connect an end winding support to the press plate, and wherein said screw is configured to reduce stress in the press plate by introducing uniform stress lines substantially parallel to the longitudinal axis via said circumferentially elongated recessed top portion.

8. A press plate for tightening the metal sheets of a stator core of an electric machine, the press plate comprising:
    an annular element having a side wall with a plurality of holes, each of the plurality of holes arranged to receive a screw configured to connect an end winding support to the press plate, wherein the annular element defines a longitudinal axis and a circumference having a center at said longitudinal axis; and
    wherein each of said plurality of holes has a circumferentially elongated recessed top portion having a depth and a ceiling, the recessed top portion being elongated in a direction perpendicular to said depth and comprises a shorter axis and a longer axis that is tangential to said circumference making said recessed top portion circumferentially elongated, and a cylindrical recessed bottom portion being threaded to receive a screw and extending from the ceiling of the elongated recessed top portion.

9. A press plate as claimed in claim 8, wherein said plurality of holes are arranged around the annular element.

10. A press plate as claimed in claim 8, wherein said recessed top portion has an elliptical shape.

11. A press plate as claimed in claim 8, wherein said recessed top portion has an oval shape.

12. A press plate as claimed in claim 8, further comprising: a tapered side wall opposite said side wall.

13. A press plate as claimed in claim 12, wherein said tapered side wall is tapered at a taper angle (α) from an axis perpendicular to the annular element longitudinal axis less than 2°.

14. A press plate as claimed in claim 8, wherein said plurality of holes are arranged in an inner row and an outer row.

15. A press plate as claimed in claim 8, wherein said circumferentially elongated recessed top portion of each of the plurality of holes is configured to reduce stress in the press plate by introducing uniform stress lines substantially parallel to the longitudinal axis.

* * * * *